United States Patent
Sorihashi

(10) Patent No.: US 8,581,910 B2
(45) Date of Patent: Nov. 12, 2013

(54) INPUT DISPLAY APPARATUS, INPUT DISPLAY METHOD, AND RECORDING MEDIUM

(75) Inventor: Toru Sorihashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 114 days.

(21) Appl. No.: 13/275,409

(22) Filed: Oct. 18, 2011

(65) Prior Publication Data

US 2012/0098835 A1    Apr. 26, 2012

(30) Foreign Application Priority Data

Oct. 20, 2010 (JP) .................................. 2010-235757

(51) Int. Cl.
G06T 11/00 (2006.01)
G09G 5/00 (2006.01)
G09G 5/02 (2006.01)

(52) U.S. Cl.
USPC ............................ 345/467; 345/581; 345/592

(58) Field of Classification Search
None
See application file for complete search history.

(56) References Cited

U.S. PATENT DOCUMENTS

| | | | |
|---|---|---|---|
| 2010/0057466 A1* | 3/2010 | Garg et al. ................ | 704/260 |
| 2010/0180197 A1 | 7/2010 | Ohashi | |
| 2011/0060590 A1* | 3/2011 | Katae et al. ................ | 704/260 |
| 2012/0123781 A1* | 5/2012 | Park et al. ................ | 704/260 |
| 2013/0041646 A1* | 2/2013 | Farley et al. ................ | 704/2 |

FOREIGN PATENT DOCUMENTS

| | | |
|---|---|---|
| JP | 63-316156 | 12/1988 |
| JP | H06-342277 | 12/1994 |
| JP | 2002-251280 A | 9/2002 |
| JP | 2003-295884 | 10/2003 |
| JP | 2007-047942 A | 2/2007 |
| WO | 2008/099505 A1 | 8/2008 |

\* cited by examiner

*Primary Examiner* — Kee M Tung
*Assistant Examiner* — Nurun N Flora
(74) *Attorney, Agent, or Firm* — Renner, Otto, Boisselle & Sklar, LLP

(57) ABSTRACT

In an input display apparatus comprising: a display section; a voice accepting section; and a position specification accepting section for accepting position specification on a display screen of the display section, a display attribute for display of a character corresponding to text data of a voice accepted by the voice accepting section is determined based on position specification accepted by the position specification accepting section, and the character is displayed based on the display attribute.

8 Claims, 6 Drawing Sheets

F I G. 3
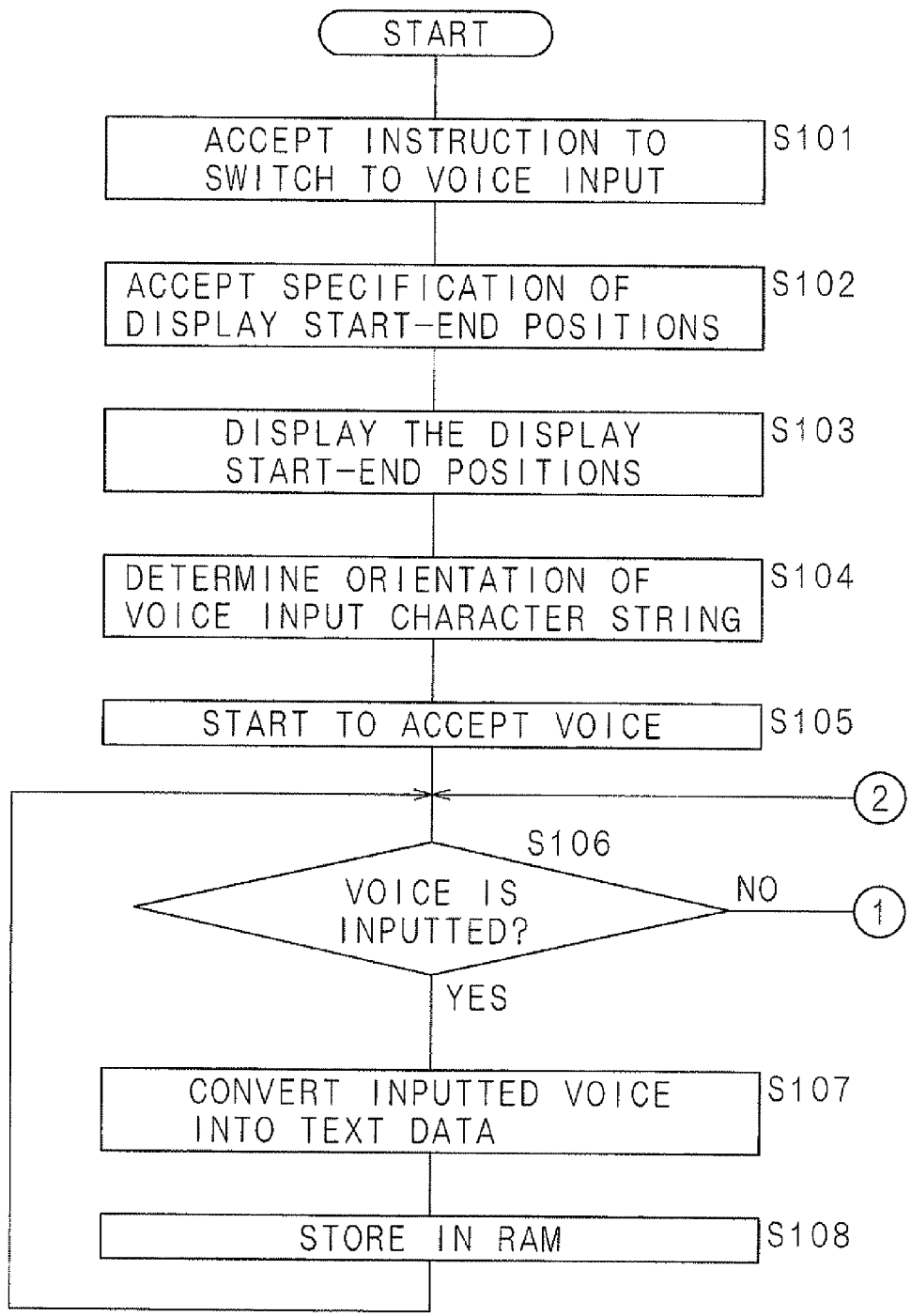

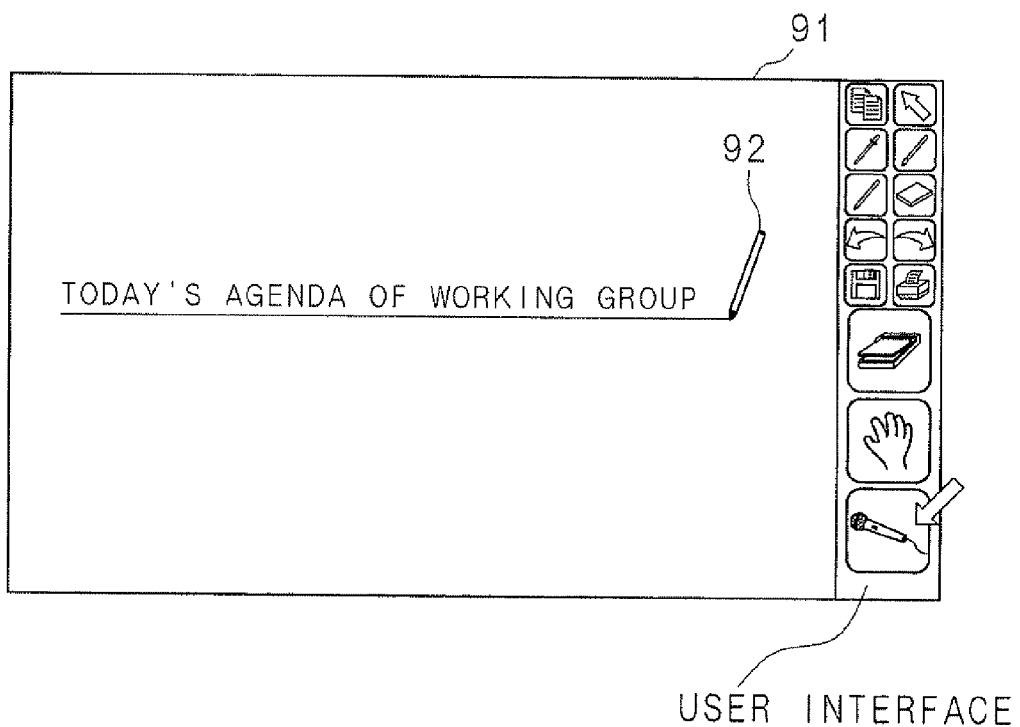

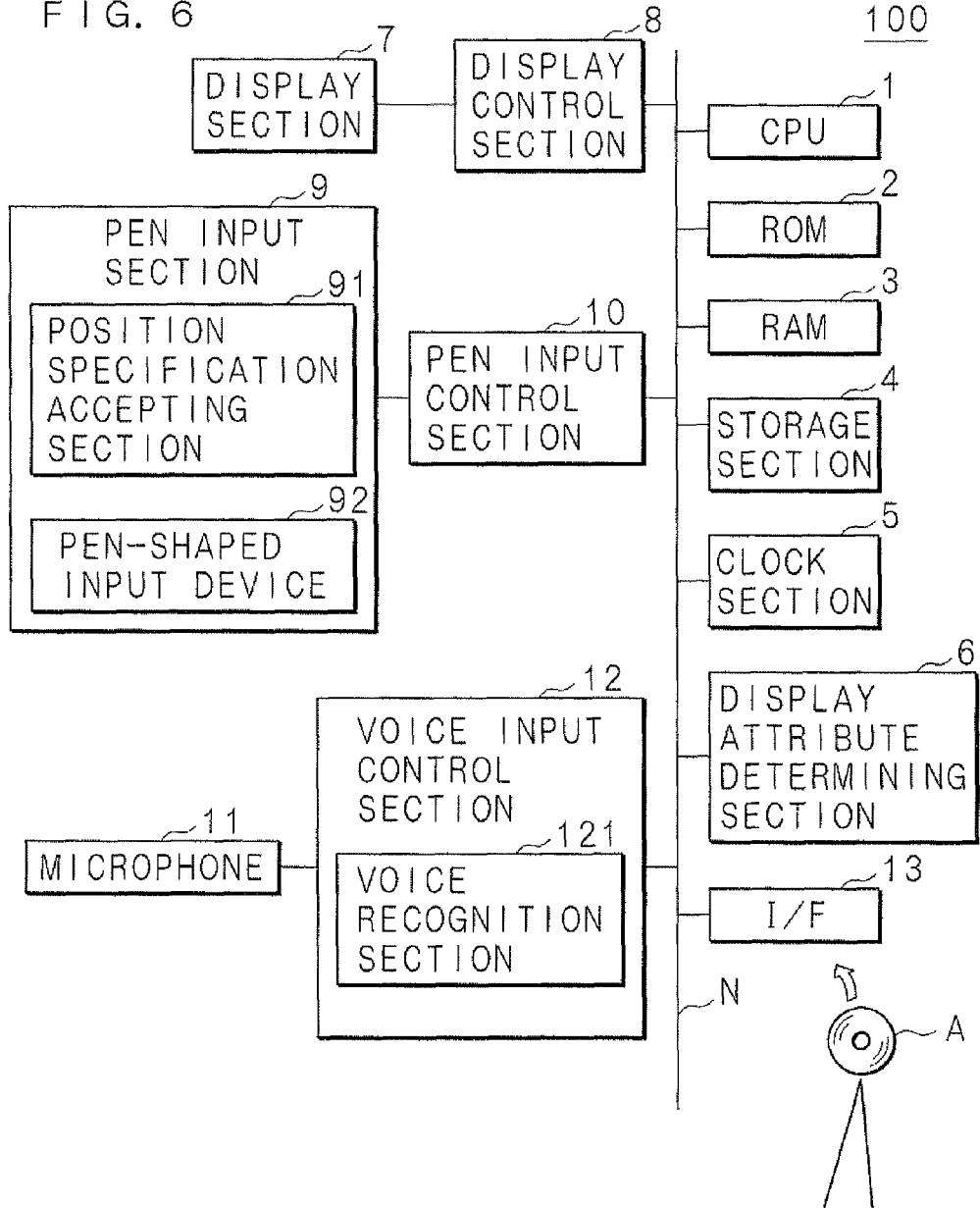

INPUT DISPLAY APPARATUS, INPUT DISPLAY METHOD, AND RECORDING MEDIUM

CROSS-REFERENCE TO RELATED APPLICATIONS

This Nonprovisional application claims priority under 35 U.S.C. §119(a) on Patent Application No. 2010-235757 filed in Japan on Oct. 20. 2010, the entire contents of which are hereby incorporated by reference.

BACKGROUND

1. Technical Field

The present invention relates to an input display apparatus, an input display method, and a recording medium storing a computer program, for accepting input of a character and displaying the character.

2. Description of Related Art

In recent years, an LCD monitor has been enlarged. Therefore, a touch-panel technique is added to the LCD monitor, and the LCD monitor becomes available as a so-called electronic blackboard.

When the LCD monitor is used as the electronic blackboard, since a user often stands before a large-sized monitor and touches a touch panel using a fingertip or a pen, it is difficult to use a keyboard together. Therefore, a method for drawing a character, a graphic, etc. is generally used, the method being performed by drawing dots at sites touched with a fingertip or a pen on the touch panel, or detecting existence of a touch operation repeatedly at a predetermined time interval, and connecting a plurality of contact coordinates acquired in this manner to lines.

On the other hand, Japanese Patent Application Laid-Open No. 2003-295884 discloses a so-called voice input mode conversion system allowing for character input leaving both hands free, in which a command is also executed with a voice and an computer interface is operated with a voice only without operating mechanical input means, such as a keyboard, etc.

SUMMARY

However, in the above-described electronic blackboard, it is difficult to correctly draw a locus due to some factors, such that coordinate detection precision and rangection rate of the touch panel are inferior and an LCD face is away from a touch panel face. For this reason, there is a problem that it is difficult to write a small character, and even if it is possible to write a small character, it is difficult to recognize the small character visually.

Moreover, there is an edit function of moving, expanding or contracting an inputted figure later as a convenient function of the electronic blackboard. However, since it is difficult to recognize characters or sentences correctly as one group, a user needs to edit respective characters or respective sentences manually. On the other hand, although a function of setting a threshold value to a time interval of an operation and recognizing one group, and a function of converting a image into a character by an OCR processing, etc. are devised, precision thereof is not enough. Such a problem cannot be solved by the voice input mode conversion system disclosed in Japanese Patent Application Laid-Open No. 2003-295884.

The present invention has been made with the aim of solving the above problems, and it is an object of the invention to provide an input display apparatus, an input display method, and a recording medium storing a computer program, which, in the input display apparatus comprising: a display section; a voice accepting section; and a position specification accepting section for accepting position specification on a display screen of the display section, determine a display attribute for the display section of a character corresponding to text data of the voice accepted by the voice accepting section, based on the position specification accepted by the position specification accepting section, and display the character based on the display attribute, and thereby accepting input and displaying become reliable and simple even if the character is a small character.

Also, another object of the present invention is to provide an input display apparatus, an input display method, and a recording medium storing a computer program, which store characters within a predetermined range collectively based on the position specification accepted by the position specification accepting section, and thereby characters or sentences can be correctly recognized as one group if necessary for a user, for example, by the storage of characters as one sentence.

The input display apparatus according to the present invention is an input display apparatus for accepting input of a predetermined character and displaying the predetermined character, comprising: a display section; a voice accepting section for accepting a voice and converting the voice into text data; a position specification accepting section for accepting position specification on a display screen of the display section; and an attribute determining section for determining a display attribute of a character corresponding to the text data based on position specification accepted by the position specification accepting section.

In the present invention, when the display section displays a character corresponding to text data of the voice accepted by the voice accepting section, the attribute determining section determines a display attribute of the character, based on the position specification accepted by the position specification accepting section. The display section displays the character, based on the display attribute determined by the attribute determining section.

The input display apparatus according to the present invention is characterized in that the attribute determining section determines a display range of the character.

In the present invention, the attribute determining section determines a display range of a character corresponding to text data of the voice accepted by the voice accepting section, based on the position specification accepted by the position specification accepting section. The display section displays the character, based on the display range determined by the attribute determining section.

The input display apparatus according to the present invention is characterized in that the attribute determining section determines a font size of the character.

In the present invention, the attribute determining section determines a font size of a character corresponding to text data of the voice accepted by the voice accepting section, based on the position specification accepted by the position specification accepting section. The display section displays the character, based on the font size determined by the attribute determining section.

The input display apparatus according to the present invention is characterized in that the attribute determining section determines an orientation of a character string composed of the character.

In the present invention, the attribute determining section determines an orientation of a character string composed of a character corresponding to text data of the voice accepted by the voice accepting section, based on the position specification accepted by the position specification accepting section. The display section displays the character string, based on the orientation determined by the attribute determining section.

The input display apparatus according to the present invention is characterized in that the attribute determining section determines, based on the display range of the character, a font size of said character.

In the present invention, for example, the attribute determining section determines a font size of the character by dividing the display range by a length of a character (or character string) corresponding to text data of the voice accepted by the voice accepting section.

The input display apparatus according to the present invention is characterized by further comprising a storage section for storing characters within the display range collectively.

In the present invention, the storage section stores characters within the display range, in other words, characters within the range from a display start position to a display end position, collectively. For example, the storage section stores characters within the range from the display start position to the display end position, as one sentence.

The input display method according to the present invention is an input display method for accepting input of a predetermined character and displaying the predetermined character using a input display apparatus comprising: a display section; a voice accepting section for accepting a voice and converting the voice into text data; and a position specification accepting section for accepting position specification on a display screen of the display section, comprising: an attribute determination step for determining a display attribute of a character corresponding to the text data based on the accepted position specification; and a display step for displaying a character corresponding to the text data based on the display attribute determined at the attribute determination step.

The recording medium according to the present invention is a non-transitory computer-readable recording medium storing a computer program for causing a computer in an input display apparatus, which includes a display section, a voice accepting section for accepting a voice and converting the voice into text data and a position specification accepting section for accepting position specification on a display screen of the display section, to accept input of a predetermined character and display the predetermined character, said computer program comprising: an attribute determination step for causing the computer to determine a display attribute of a character corresponding to the text data, based on the accepted position specification; and a display step for causing the computer to display a character corresponding to the text data, based on the display attribute determined at the attribute determination step.

In the present invention, when the display section displays a character corresponding to text data of the voice accepted by the voice accepting section, a display attribute of the character is determined based on the position specification accepted by the position specification accepting section. The display section displays the character based on the determined display attribute.

In the present invention, the above-described computer program is recorded in the recording medium. A computer reads the computer program from the recording medium, and the above-described input display apparatus and input display method are realized by the computer.

According to the present invention, even if an inputted character is a small character, acceptance and display of the character can be performed reliably and easily.

According to the present invention, characters or sentences inputted by a user can be correctly recognized as one group if necessary for the user.

The above and further objects and features will more fully be apparent from the following detailed description with accompanying drawings.

BRIEF DESCRIPTION OF THE SEVERAL VIEWS OF THE DRAWINGS

FIG. 3 is a flow chart showing a process of accepting input of a character and displaying the character in the electronic blackboard apparatus according to Embodiment 1 of the present invention.

FIG. 5 is an exemplary view showing the process by the electronic blackboard device according to Embodiment 1 of the present invention.

FIG. 6 is a functional block diagram showing essential configurations of an electronic blackboard apparatus according to Embodiment 2 of the present invention.

DETAILED DESCRIPTION (Embodiment 1)

The following description will explain an example in which an input display apparatus, an input display method and a recording medium according to Embodiments of the present invention are applied to the so-called electronic blackboard apparatus, based on the drawings in detail.

Figure 1:
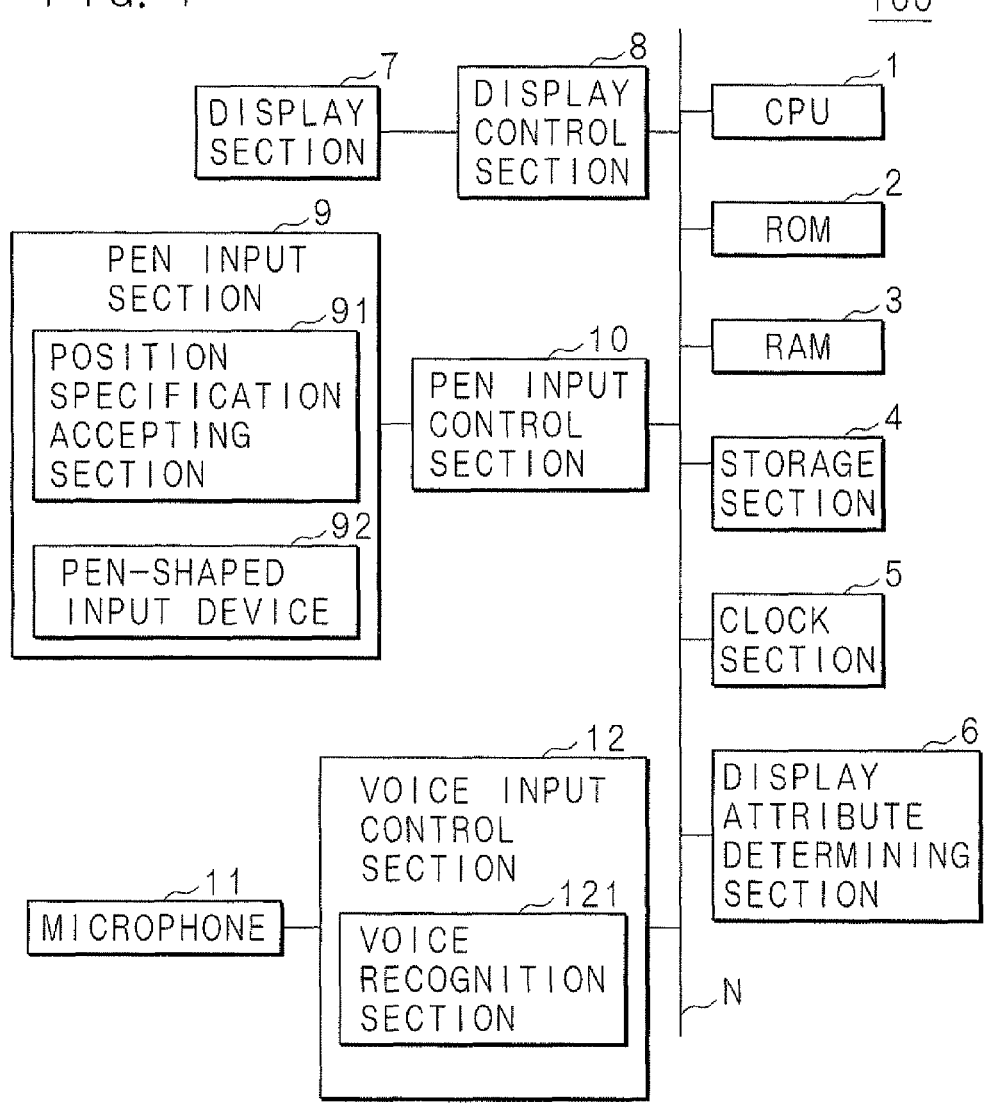
FIG. 1 is a functional block diagram showing essential configurations of an electronic blackboard apparatus according to Embodiment 1 of the present invention.

FIG. 1 is a functional block diagram showing essential configurations of an electronic blackboard apparatus 100 according to Embodiment 1 of the present invention. The electronic blackboard apparatus 100 comprises a CPU 1, a ROM 2 and a RAM 3.

The ROM 2 stores various kinds of control programs (for example, an electronic blackboard application, an application for drawing, an application for accepting a voice, etc.) in advance, and the RAM 3 is capable of storing data temporarily and allows the data to be read regardless of the order and place they are stored. The RAM 3 stores, for example, a program read from the ROM 2, various kinds of data generated by the execution of the program, and the like. Also, the RAM 3 stores a later-described coordinate history.

The CPU 1 controls a later-described various hardware devices via a bus N by loading on the RAM 3 the control program stored in the ROM 2 in advance and executing it, creates the coordinate history, and operates the whole apparatus as the electronic blackboard apparatus 100 of the present invention.

Moreover, the electronic blackboard apparatus 100 further comprises: a display section 7; a display control section 8 for controlling display of a character, a line drawing etc., on the display section 7; a pen input section 9 for accepting position specification on the display section 7 and input of a character, a line drawing etc., from a user via a later-described pen-shaped input device 92; a pen input control section 10 for controlling acceptance of input by the pen input section 9; a microphone 11 for accepting a voice from a user; and a voice input control section 12 for controlling acceptance of a voice by the microphone 11.

Furthermore, the electronic blackboard apparatus 100 further comprises: a storage section 4 which is a non-volatile semiconductor memory such as a hard disk, for example, and stores a later-described font table; a clock section 5 for clocking a time passage from a predetermined time; and a display attribute determining section 6 (attribute determining section) for determining a display attribute when the display control section 8 causes the display section 7 to display a character or a character string.

The display section 7 is an LCD monitor, for example, and displays a line drawing and a character accepted from a user via the pen input section 9 and the microphone 11. Moreover, the display section 7 displays a user interface screen for selecting software which operates in the electronic blackboard apparatus 100, and activating it.

The display control section 8 causes the display section 7 to display a character corresponding to a voice accepted via the microphone 11 or a character string composed of the character, based on a display attribute determined by the display attribute determining section 6. As the display attribute, there are a display range of a character or a character string to be displayed, i.e., a display start position and a display end position (hereinafter referred to as display start-end positions), a font size, and a vertical writing or a horizontal writing (orientation), for example. Moreover, the display control section 8 causes the display section 7 to display a line drawing inputted by a user via the pen-shaped input device 92, based on coordinates concerning position specification accepted by a later-described position specification accepting section 91.

Figure 2:
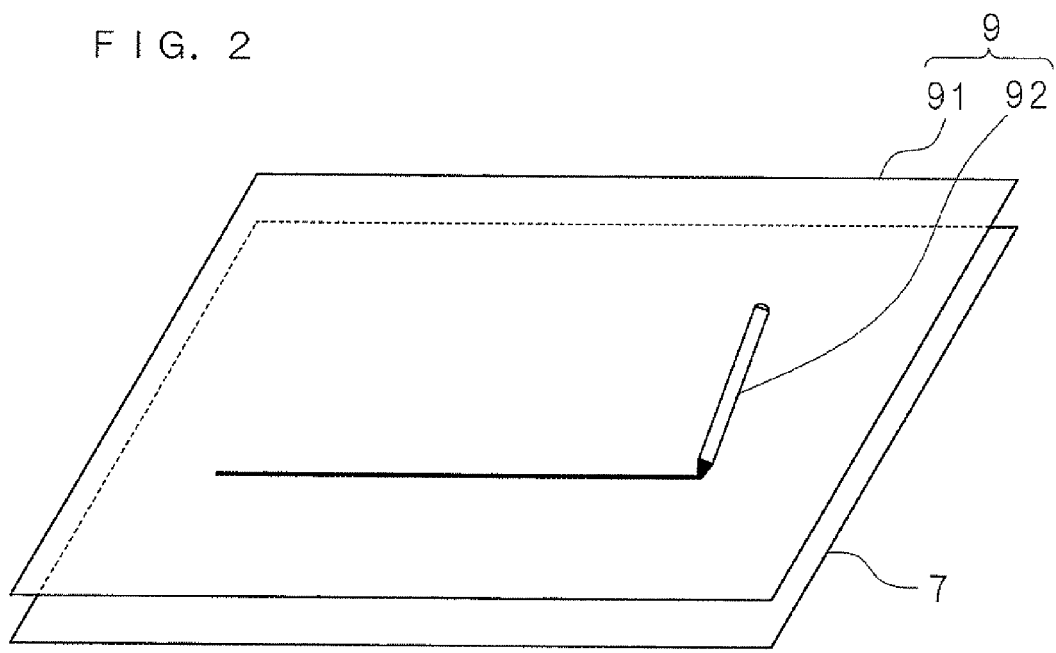
FIG. 2 is an explanatory diagram explaining a configuration of a display section and a pen input section provided in the electronic blackboard apparatus according to Embodiment 1 of the present invention.

FIG. 2 is an explanatory diagram explaining a configuration of the display section 7 and the pen input section 9 provided in the electronic blackboard apparatus 100 of Embodiment 1.

The pen input section 9 is a so-called touch panel, and has a position specification accepting section 91 for accepting position specification on a display screen of the display section 7 from a user, and a pen-shaped input device 92 which has a pen-shape and is used when a user specifies a position and inputs a character and a line drawing. The pen input section 9 accepts position specification on the display section 7, and input of a character, a line drawing, etc. from a user via the position specification accepting section 91 and the pen-shaped input device 92.

The pen input control section 10 controls input acceptance of the pen input section 9, and sends to the CPU 1 coordinates concerning position specification accepted via the position specification accepting section 91 of the pen input section 9 (hereinafter referred to as specified coordinates).

The CPU 1 acquires specified coordinates from the pen input control section 10, and creates a coordinate history in which the specified coordinates are associated in detection order, and the RAM 3 stores the created coordinate history. The display control section 8 causes the display section 7 to display a line drawing, for example, based on the coordinate history stored in the RAM 3. The contents will be explained below.

The position specification accepting section 91 of the pen input section 9 is superimposed on the display screen of the display section 7. In the present embodiment, suppose that the position specification accepting section 91 is a so-called light-blocking type. In the light-blocking type, input is realized by the position specification accepting section 91 detecting light-blocking according to approach of a tip of the pen-shaped input device 92 to the close vicinity of a surface of the position specification accepting section 91.

A user activates application software for drawing installed in the electronic blackboard apparatus 100 in advance, and inputs image data. For example, the following description will explain an example in which a user draws one line on a surface of the position specification accepting section 91 using the pen-shaped input device 92. When light-blocking is detected at first and then light-blocking is detected continuously, the CPU 1 judges that input of one line is started and is ongoing at the moment. On the other hand, when the light-blocking stops and a predetermined period of time has passed, the CPU 1 judges that the input of the one line is completed. Thereby, image data (for example, coordinate history) concerning the one line can be acquired, and the one line is displayed on the display section 7 based on the image data.

The position specification accepting section 91 recognizes the drawn line as a group of a plurality of continuous dots, and detects coordinates (specified coordinates) of each dot. The detected coordinates of each dot are sent to the CPU 1 via the pen input control section 10. The CPU 1 receives the sent specified coordinates, and creates a coordinate history in which the specified coordinates are associated in detection order, and the RAM 3 stores the created coordinate history. The CPU 1 gives an instruction for the display control section 8 to cause the display section 7 to display a predetermined line drawing composed of a plurality of line data for example, based on the coordinate history.

A user inputs a voice using the microphone 11, and the voice input control section 12 converts the voice accepted via the microphone 11 into voice data, and obtains text data. The voice input control section 12 has a voice recognition section 121 (voice accepting section).

The voice recognition section 121 converts an analog voice signal accepted via the microphone 11 into voice data, classifies the voice data into lexical strings based on an acoustic model, a word dictionary, etc., and transposes the lexical strings into text data of a meaningful word. The RAM 3 stores the text data.

The display attribute determining section 6 determines a display attribute based on the position specification (specified coordinates) accepted via the pen input section 9. The contents will be explained below.

In the electronic blackboard apparatus 100 of the present invention, a user specifies a predetermined range on the display screen of the display section 7, and inputs a voice using the microphone 11, and a character or a character string corresponding to the voice (hereinafter referred to as a voice input character string) is displayed within the predetermined range. Note that the predetermined range is specified when a user draws one line on the surface of the position specification accepting section 91 using the pen-shaped input device 92.

Thus, when a user draws one line on the surface of the position specification accepting section 91, the position specification accepting section 91 accepts the drawing of the one line as position specification, detects coordinates of a start point and a end point of the one line, and sends the coordinates to the display attribute determining section 6 via the pen input control section 10. The display attribute determining section 6 determines the detected coordinates of the start point and the end point of the one line as display start-end positions (display range) of the voice input character string.

Moreover, the display attribute determining section 6 determines an orientation of the voice input character string by comparing the coordinates of the start point with the coordinates of the end point. For example, when a Y value of the coordinates of the start point is equal to a Y value of the coordinates of the end point and an X value of the coordinates of the start point is smaller than an X value of the coordinates of the end point, the display attribute determining section 6 determines that the voice input character string should be displayed with the horizontal writing. On the other hand, when the X value of the coordinates of the start point is equal to the X value of the coordinates of the end point and the Y value of the coordinates of the start point is larger than the Y value of the coordinates of the end point, the display attribute determining section 6 determines that the voice input character string should be displayed with the vertical writing.

Moreover, the display attribute determining section 6 calculates a distance between the detected coordinates of the start point and the detected coordinates of the end point, divides the distance by the number of characters of the voice input character string, and thereby determines a font size of the voice input character string. The storage section 4 stores the font table in which a calculated value obtained by dividing the distance between the coordinates of the start point and the coordinates of the end point by the number of characters of the voice input character string and a font size corresponding to the calculated value are associated with each other. The display attribute determining section 6 determines the font size of the voice input character string based on the font table.

Figure 4:
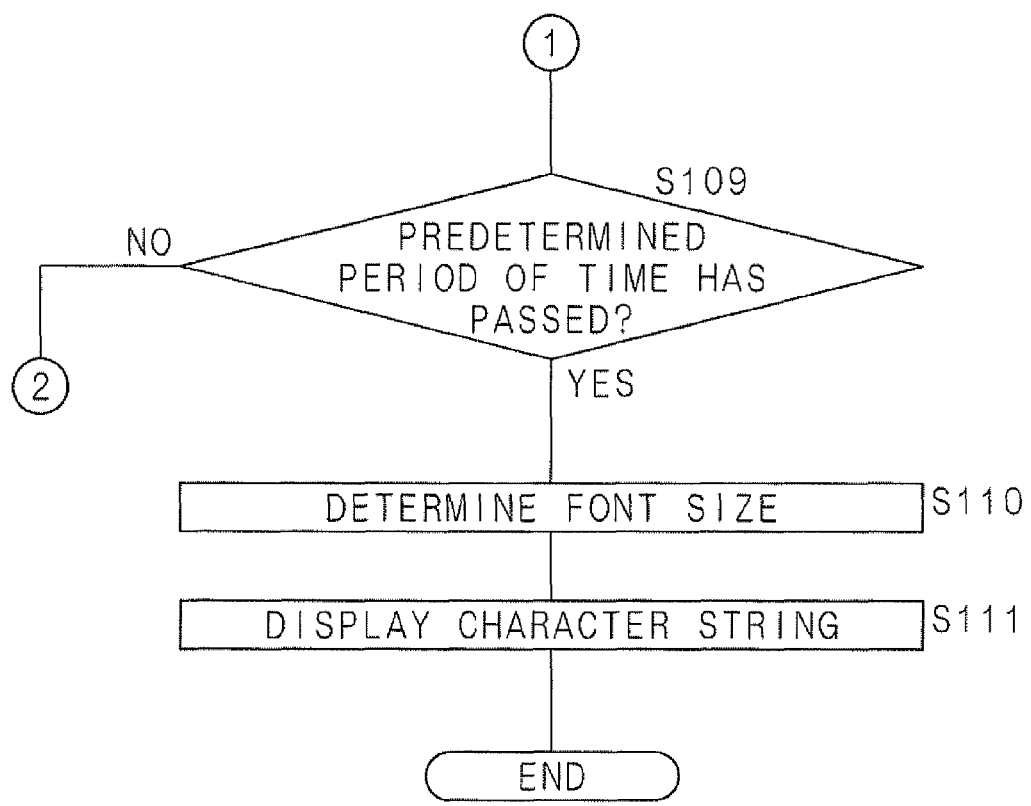
FIG. 4 is a flow chart showing the process of accepting input of a character and displaying the character in the electronic blackboard apparatus according to Embodiment 1 of the present invention.

FIGS. 3 and 4 are flow charts showing a process of accepting input of a character and displaying the character in the electronic blackboard apparatus 100 according to Embodiment 1 of the present invention. For convenience of description, the following description will explain an example in which a user draws one line on the surface of the position specification accepting section 91 using the pen-shaped input device 92, thereby specifies a range in which a voice input character string should be displayed on the display screen of the display section 7, and inputs a voice using the microphone 11, and one voice input character string corresponding to the voice is displayed within the range.

For example, a user touches a soft key for voice input provided in the user interface screen (refer to FIG. 5). At this time, the position specification accepting section 91 accepts position specification by the user's touch operation, and the CPU 1 accepts an instruction to switch to voice input, based on specified coordinates corresponding to the position specification (Step S101). The CPU 1 loads on the RAM 3 the application for accepting a voice, stored in the ROM 2 in advance, and activates it.

Subsequently, the user draws one line on the surface of the position specification accepting section 91 using the pen-shaped input device 92, and specifies a range in which a voice input character string should be displayed. The position specification accepting section 91 detects coordinates of a start point and an end point of the one line, and the CPU 1 accepts the detection of the coordinates as specification of display start-end positions of the voice input character string (Step S102), and the display attribute determining section 6 determines the coordinates of the start point and the end point as the display start-end positions of the voice input character string.

The CPU 1 gives an instruction for the display control section 8 to cause the display section 7 to display the one line based on the coordinate history concerning the one line. According to the instruction of the CPU 1, the display control section 8 causes the display section 7 to display the one line based on the coordinate history. Thereby, the display start-end positions are displayed on the display section 7 (Step S103).

Subsequently, the display attribute determining section 6 determines whether the voice input character string should be displayed with vertical or horizontal writing using the above-described procedure (Step S104). For convenience of description, suppose that the display attribute determining section 6 has determined that the voice input character string should be displayed with the horizontal writing, in this embodiment.

Then, the CPU 1 gives an instruction for the voice input control section 12 to start to accept a voice, and the voice input control section 12 starts to accept a voice from a user via the microphone 11 (Step S105).

The CPU 1 monitors the microphone 11. In detail, the CPU 1 monitors whether or not a voice signal is outputted from the microphone 11, and thereby determines whether or not a voice is inputted by a user (Step S106).

When the CPU 1 determines that the voice is inputted by the user since the voice signal is outputted from the microphone 11 (Step S106: YES), the CPU 1 gives an instruction for the voice recognition section 121 to convert the accepted voice into text data. According to the instruction of the CPU 1, the voice recognition section 121 converts the voice accepted via the microphone 11 into text data using the above-described procedure (Step S107).

At this time, the data obtained at Step S107 is stored in the RAM 3 (Step S108). The process returns to Step S106 again, after Step S108.

On the other hand, when the CPU 1 determines that the voice is not inputted by the user since the voice signal is not outputted from the microphone 11 (Step S106: NO), the CPU 1 gives an instruction for the clock section 5 to start to clock a time passage. Subsequently, the CPU 1 determines whether or not a predetermined period of time has passed from the start of clocking (Step S109).

When the CPU 1 determines that the predetermined period of time has not passed from the start of clocking (Step S109: NO), the CPU 1 returns the process to Step S106. On the other hand, when the CPU 1 determines that the predetermined period of time has passed from the start of clocking (Step S109: YES), in other words, when the predetermined period of time has passed from a stop of the voice input by the user, and the voice input by the user is recognized to be completed, the display attribute determining section 6 determines that a font size of the voice input character string (Step S110). The determination of the font size by the display attribute determining section 6 is performed as described above, and detailed explanations thereof will be omitted.

The above process allows for determination of display attributes for displaying a voice input character string on the display section 7, i.e., display start-end positions (start and end positions), a font size and an orientation.

Subsequently, the CPU 1 gives an instruction for the display control section 8 to cause the display section 7 to display a voice input character string based on the display attributes. According to the instruction of the CPU 1, the display control section 8 causes the display section 7 to display a voice input character string, based on the determined display attributes, text data stored in the RAM 3, etc. (Step S111).

FIG. 5 is an exemplary view showing the process by the electronic blackboard device 100 according to Embodiment 1 of the present invention. For convenience of description, the following description will explain an example in which a user inputs a voice of a character string "today's agenda of working group" using the microphone 11.

For example, a user draws one straight line on the surface of the position specification accepting section 91 using the pen-shaped input device 92, and then touches the soft key for voice input provided on the user interface screen (expressed with an arrow relieved in white in FIG. 5), and inputs a voice for a character string by vocalizing "today's agenda of working group". The character string is accepted via the microphone 11, the above-described process is performed with respect to the character string, and as shown in FIG. 5, the character string is displayed along the one straight line in alphabet.

Then, the CPU 1 stores the voice input character string within the range corresponding to the display start-end positions, i.e., the voice input character string along the straight line, collectively, for example, as one sentence in the storage section 4.

Although the example is explained in which the voice input is recognized to be completed when a voice signal is not outputted for a predetermined period of time in the above-described embodiment, the present invention is not limited to this. It is also possible to give a completion indication explicitly by a predetermined gesture, such as an operation of the pen-shaped input device 92, for example, drawing of a line intersecting the one straight line (refer to FIG. 5).

Although the example is explained in which a voice (character) is accepted by drawing of one straight line in the above-described embodiment, the present invention is not limited to this. For example, it may be configured so that when operations of "drawing of a character "V"", "drawing of a closed curve", and "reciprocating on a character string once or more" are performed, they are accepted as instructions for performing "insertion", "highlight and color modification", and "deletion of part or all", respectively.

Moreover, it may be configured so that when a predetermined character string (word) is touched twice with the use of the pen-shaped input device 92, the word is selected by being surrounded with a predetermined selection frame, scaling can be performed by dragging of the selection frame with the use of the pen-shaped input device 92, and parallel displacement can be performed by dragging of the inside of the selection frame.

Although the example is explained in which position specification is accepted with the use of the so-called touch panel (pen input section 9) in the above-described embodiment, the present invention is not limited to this. For example, it may be configured so that cameras are provided at two sites of the display section 7, and coordinates concerning the one straight line are acquired with the use of the cameras.

Furthermore, although the example is explained in which a range in which a voice input character string should be displayed is specified by drawing of one line in the above-described embodiment, the present invention is not limited to a line, but it may be a dot, a parenthesis, etc., for example. Also, the line may be transparent.

Due to the above-described configuration, it is possible to write on the blackboard more legible by an easy operation in the electronic blackboard apparatus of the present invention. Moreover, by storing a character string portion as a text data, not as an image, it is possible to decrease a storage capacity and search a file by a full-text search, when the character string is electronically accumulated, for example. Furthermore, it is possible to print with high resolution and print a beautiful character.

(Embodiment 2)

FIG. 6 is a functional block diagram showing essential configurations of an electronic blackboard apparatus 100 according to Embodiment 2 of the present invention. The electronic blackboard apparatus 100 of Embodiment 2 is configured so that a computer program for operations is capable of being provided by a removable recording medium A, such as a CD-ROM, through an I/F 13. Moreover, the electronic blackboard apparatus 100 of Embodiment 2 is configured so that the computer program is capable of being downloaded from an external device (not shown) through the I/F 13. The contents will be explained below.

The I/F 13 of Embodiment 2 comprises an external (or internal) recording medium reader device (not shown). A removable recording medium A, which stores a program for determining a display attribute of a character corresponding to text data, based on an accepted position specification, and displaying the character corresponding to the text data based on the determined display attribute, is inserted into the recording medium reader device, and, for example, a CPU 1 installs the program in a ROM 2. The program is loaded in a RAM 3 and executed. Consequently, it functions as the electronic blackboard apparatus 100 of Embodiment 1 of the present invention.

The recording medium may be a so-called program media, or a medium carrying program codes in a fixed manner, such as tapes including a magnetic tape and a cassette tape, disks including magnetic disks such as a flexible disk and a hard disk, and optical disks such as a CD-ROM, an MO, an MD, and a DVD, cards, such as an IC card (including a memory card) and an optical card, or semiconductor memory such as a mask ROM, an EPROM, and an EEPROM, and a flash ROM.

Or, the recording medium may be a medium carrying program codes in flowing manner like downloading the program codes from a network through the I/F 13. In the case where the program is downloaded from a communication network in such a manner, a program for downloading is stored in the main apparatus in advance, or installed from a different recording medium. Note that the present invention is also implemented in the form of a computer data signal embedded in a carrier wave in which the program codes are embodied by an electronic transfer.

The same parts as in Embodiment 1 are designated with the same reference numbers, and detailed explanations thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An input display apparatus for accepting input of a predetermined character and displaying the predetermined character, comprising:
   a display section;
   a voice accepting section configured to accept a voice and to convert the voice into text data;
   a position specification accepting section configured to accept position specification on a display screen of the display section; and
   an attribute determining section configured to determine a display attribute of a character corresponding to the text data based on position specification accepted by the position specification accepting section,
   wherein the position specification accepting section is configured to accept the position specification as a drawn line that is transparent on the display screen, and the display attribute comprises displaying a range of characters of the text data as a character string on the transparent line.

2. The input display apparatus according to claim 1, wherein the attribute determining section determines a display range of the character.

3. The input display apparatus according to claim 2, wherein
the attribute determining section determines, based on the display range of the character, a font size of said character.

4. The input display apparatus according to claim 2, further comprising a storage section configured to store characters within the display range collectively.

5. The input display apparatus according to claim 1, wherein
the attribute determining section determines a font size of the character.

6. The input display apparatus according to claim 1, wherein
the attribute determining section determines an orientation of the character string.

7. An input display method for accepting input of a predetermined character and displaying the predetermined character using a input display apparatus comprising: a display section; a voice accepting section configured to accept a voice and to convert the voice into text data; and a position specification accepting section configured to accept position specification on a display screen of the display section, comprising:
an attribute determination step for determining a display attribute of a character corresponding to the text data based on the accepted position specification; and
a display step for displaying a character corresponding to the text data based on the display attribute determined at the attribute determination step,
wherein the position specification accepting section is configured to accept the position specification as a drawn line that is transparent on the display screen, and the display attribute comprises displaying a range of characters of the text data as a character string on the transparent line.

8. A non-transitory computer-readable recording medium storing a computer program for causing a computer in an input display apparatus, which includes a display section, a voice accepting section configured to accept a voice and to convert the voice into text data and a position specification accepting section configured to accept position specification on a display screen of the display section, to accept input of a predetermined character and display the predetermined character, said computer program comprising:
an attribute determination step for causing the computer to determine a display attribute of a character corresponding to the text data, based on the accepted position specification; and
a display step for causing the computer to display a character corresponding to the text data, based on the display attribute determined at the attribute determination step,
wherein the position specification accepting section is configured to accept the position specification as a drawn line that is transparent on the display screen, and the display attribute comprises displaying a range of characters of the text data as a character string on the transparent line.

* * * * *